United States Patent [19]

Veazey et al.

[11] 4,435,519

[45] Mar. 6, 1984

[54] NOVEL CATALYST COMPOSITION

[75] Inventors: Richard L. Veazey, East Windsor, N.J.; B. Timothy Pennington, Sulphur, La.

[73] Assignee: Cities Service Co., Tulsa, Okla.

[21] Appl. No.: 444,289

[22] Filed: Nov. 24, 1982

[51] Int. Cl.$^3$ .............................................. C08F 4/68
[52] U.S. Cl. .................................. 502/107; 502/111; 502/125; 526/124; 526/129; 526/142; 526/156
[58] Field of Search ............... 252/429 B, 429 C, 428, 252/430

[56] References Cited

U.S. PATENT DOCUMENTS

| | | | |
|---|---|---|---|
| 3,457,244 | 7/1969 | Fukuda et al. | 526/142 |
| 3,535,269 | 10/1970 | Tanaka et al. | 252/429 B |
| 3,591,656 | 7/1971 | Kroll | 252/429 C X |
| 4,113,933 | 9/1978 | Schweier et al. | 252/429 C X |
| 4,148,754 | 4/1979 | Strobel et al. | 252/429 C |
| 4,263,171 | 4/1981 | Shida et al. | 252/429 C |
| 4,330,648 | 5/1982 | Welch | 252/429 B X |
| 4,333,851 | 6/1982 | Speakman et al. | 252/429 B |

FOREIGN PATENT DOCUMENTS 1175593 12/1969 United Kingdom .
1489410 10/1977 United Kingdom .

*Primary Examiner*—Patrick Garvin
*Attorney, Agent, or Firm*—Patricia J. Hogan

[57] ABSTRACT

Vanadium compound/organometallic compound/inorganic oxide catalyst compositions useful for the polymerization of ethylene to polymers having a molecular weight distribution that can be controlled by selection of the appropriate member of a particular family of vanadium compounds are obtained by using, as the vanadium component, at least one vanadium compound prepared by reacting one molar proportion of $VOCl_3$ and/or $VOBr_3$ with about 0.5 to 1 molar proportion of a diol corresponding to the formula HO-R-OH, wherein R is a divalent hydrocarbon radical having a chain length of 2 to 16 carbon atoms. The molecular weight distributions of polymers formed in the presence of the catalyst compositions are narrowed as the chain length of R is increased. The preferred vanadium compounds are those prepared by reacting $VOCl_3$ with a diol wherein R is a straight- or branched-chain alkylene group containing 2 to 6 carbon atoms.

15 Claims, No Drawings

NOVEL CATALYST COMPOSITION

BACKGROUND OF THE INVENTION

1. Field of the Invention

This invention relates to the polymerization of olefins and more particularly relates to catalyst compositions useful for polymerizing one or more monomers comprising ethylene to polymers having a controlled molecular weight distribution and a good balance of physical properties.

2. Description of the Prior Art

It is known that catalysts of the type variously described as coordination, Ziegler, Ziegler-type, or Ziegler-Natta catalysts are useful for the polymerization of olefins under moderate conditions of temperature and pressure. It is also known that the properties of the polymers obtainable by the use of such catalysts, as well as the relative economies of the processes used to prepare the polymers, vary with several factors, including the choice of the particular monomers, catalyst components, polymerization adjuvants, and other polymerization conditions employed.

During the years since Ziegler catalysts were first publicly disclosed, there has been a considerable amount of research conducted on the use of such catalysts; and numerous publications have resulted from that research. These publications have added much to the knowledge of how to make various types of olefin polymers by various types of processes. However, as is apparent from the amount of research on Ziegler catalysis that is still being conducted throughout the world, as well as the number of patents that are still being issued to inventors working in the field of Ziegler catalysis, the means of attaining certain results when polymerizing olefins with Ziegler catalysts are still frequently unpredictable. The fact that this situation exists is sometimes due to the need to obtain a previously-unattainable combination of results; occasionally due to difficulties in obtaining the same results in a commercial-scale apparatus as in a laboratory-scale reactor; and often due to a polymerization parameter's having an effect, or side-effect, in a given type of polymerization process that is different from effects achieved by its use in prior art processes of a different type.

One aspect of Ziegler catalysis in which the need for further research has been found to exist has been in the provision of catalyst compositions suitable for use in a commercially-feasible process for preparing ethylene polymers having a good balance of physical properties and a molecular weight distribution that can be controlled so as to make the polymers formable by whichever forming technique is intended to be employed for producing articles from the polymers, e.g., injection molding or blow molding.

There are, of course, known processes for preparing injection molding resins, as well as known processes for preparing blow molding resins, by polymerizing ethylene with the aid of Ziegler catalysts. However, the known processes typically suffer one or more of the disadvantages of lack of economy, inability to produce polymers having a suitable balance of properties, and/or unreliability in producing such polymers—particularly in commercial-scale operations. Moreover, the different molecular weight distribution requirements of polymers to be formed by different techniques have compounded the problem of finding a family of catalyst compositions suitable for use in a commercially-feasible process wherein the molecular weight distribution can be controlled so as to produce the desired polymers. What is still needed is a catalyst which (a) is suitable for use in a gas-phase polymerization process, (b) is capable of yielding polymers having a good balance of physical properties and a controlled molecular weight distribution, and (c) has sufficient activity to be economically attractive.

British Pat. No. 1,489,410 (Monsanto) teaches gas-phase polymerization processes which, because of their use of supported Ziegler catalysts having a vanadium component and other factors, are commercially attractive processes. However, as taught in the patent, the processes are designed only for the preparation of polymers having the relatively broad molecular weight distributions suitable for blow molding resins, i.e., molecular weight distributions such that their normalized $V_{30}/V_{300}$ melt viscosity ratios are above 2.3. Moreover, it has been found that these processes, although useful for preparing blow-molding resins of the type employed for household chemical containers, do not appear to be adaptable to the preparation of blow-molding resins requiring somewhat narrower molecular weight distributions, e.g., liquid food containers, or to the preparation of injection-molding resins requiring still narrower molecular weight distributions.

Attempts to make the processes of the Monsanto patent suitable for the preparation of injection molding resins, as well as more reliable in the preparation of desirable blow molding resins, by combining the teachings of the patent with the teachings of publications that discuss means of narrowing molecular weight distribution have not been successful. For example, polymers having a sufficiently narrow molecular weight distribution have not been obtained when Monsanto's preferred vanadium halides have been replaced with the alkoxy group-containing vanadium compounds which are within the scope of their patent and which U.S. Pat. Nos. 3,457,244 (Fukuda et al.) and 3,655,583 (Yamamoto et al.) teach to result in the production of polymers having narrower molecular weight distributions when unsupported catalyst systems are employed.

British Pat. No. 1,175,593 (Stamicarbon) teaches a process for preparing ethylene/higher alkene/polyunsaturated compound terpolymers by the use of an unsupported vanadium chloride/alkylaluminum halide catalyst system, the activity of which is increased by adding an alcohol or phenol to the vanadium compound and/or the aluminum compound. According to the speculative teachings of the patent, the alcohol may be a polyhydric alcohol in which the —OH groups are not attached to adjacent carbon atoms, but the patent does not mention any particular polyhydric alcohol that might be used or suggest the effect that the inclusion of a polyhydric alcohol might have on molecular weight distribution if the catalyst composition were being used for the preparation of crystallizable ethylene polymers, such as injection molding or blow molding resins, rather than the rubbers of the patent.

SUMMARY OF THE INVENTION

An object of the invention is to provide novel catalyst compositions useful for the polymerization of olefins.

Another object is to provide such catalyst compositions useful in an economical gas-phase process for polymerizing one or more monomers comprising ethylene to polymers having a controlled molecular weight distribution and a good balance of physical properties.

Still another object is to provide processes for preparing such catalyst compositions.

A further object is to provide olefin polymerization processes utilizing the novel catalyst compositions.

These and other objects are attained by:

(A) preparing a catalyst composition by:
(1) drying an inorganic oxide having surface hydroxyl groups to form a support that is substantially free of adsorbed water,
(2) reacting the surface hydroxyl groups of the support with at least a substantially stoichiometric amount of at least one organometallic compound corresponding to the formula $R_xMR'_yR''_z$, wherein M is a metal of Group III of the periodic table, R is an alkyl group containing 1 to 12 carbon atoms, R' and R'' are independently selected from the group consisting of H, Cl, and alkyl and alkoxy groups containing 1 to 12 carbon atoms, x has a value of 1 to 3, and y and z both represent values of 0 to 2, the sum of which is not greater than 3-x, and
(3) reacting the thus-treated support with at least about 0.001 mol, per mol of organometallic compound, of at least one vanadium compound prepared by reacting one molar proportion of $VOCl_3$ and/or $VOBr_3$ with about 0.5 to 1 molar proportion of a diol corresponding to the formula HO-R-OH, wherein R is a divalent hydrocarbon radical having a chain length of 2 to 16 carbon atoms and (B) when desired, polymerizing a monomer charge comprising ethylene in contact with the catalyst composition thus prepared.

DETAILED DESCRIPTION

The inorganic oxide used in preparing a catalyst composition of the invention may be any particulate inorganic oxide or mixed oxide, e.g., silica, alumina, silica-alumina, magnesia, zirconia, thoria, titania, etc., having surface hydroxyl groups capable of reacting with the organometallic compound. However, it is generally an inorganic oxide selected from the group consisting of silica, alumina, magnesia, and mixtures thereof, i.e., physical mixtures, such as mixtures of silica and alumina particles, etc., and/or chemical mixtures, such as magnesium silicate, aluminum silicate, etc. The surface hydroxyl groups may be at the outer surfaces of the oxide particles or at the surfaces of pores in the particles, the only requirement in this regard being that they be available for reaction with the organometallic compound.

The specific particle size, surface area, pore volume, and number of surface hydroxyl groups characteristic of the inorganic oxide are not critical to its utility in the practice of the invention. However, since such characteristics determine the amount of inorganic oxide that it is desirable to employ in preparing the catalyst compositions, as well as sometimes affecting the properties of polymers formed with the aid of the catalyst compositions, these characteristics must frequently be taken into consideration in choosing an inorganic oxide for use in a particular aspect of the invention. For example, when the catalyst composition is to be used in a gas-phase polymerization process—a type of process in which it is known that the polymer particle size can be varied by varying the particle size of the support—the inorganic oxide used in preparing the catalyst composition should be one having a particle size that is suitable for the production of a polymer having the desired particle size. In general, optimum results are usually obtained by the use of inorganic oxides having an average particle size in the range of about 30 to 600 microns, preferably about 30 to 100 microns; a surface area of about 50 to 1000 square meters per gram, preferably about 100 to 400 square meters per gram; and a pore volume of about 0.5 to 3.5 cc per gram, preferably about 0.5 to 2 cc per gram.

As indicated above, the organometallic compound that is reacted with the surface hydroxyl groups of the inorganic oxide in the practice of the invention may be any one or more organometallic compounds corresponding to the formula $R_xMR'_yR''_z$, wherein M is a metal of Group III of the periodic table, R is an alkyl group containing 1 to 12 carbon atoms, R' and R'' are independently selected from the group consisting of H, Cl, and alkyl and alkoxy groups containing 1 to 12 carbon atoms, x has a value of 1 to 3, and y and z both represent values of 0 to 2, the sum of which is not greater than 3-x. Thus, M may be, e.g., aluminum, gallium, indium, or thallium; R may be, e.g, methyl, ethyl, propyl, isopropyl, n-butyl, isobutyl, n-pentyl, isopentyl, t-pentyl, hexyl, 2-methylpentyl, heptyl, octyl, 2-ethylhexyl, nonyl, decyl, dodecyl, etc.; R', when present, may be H, Cl, an alkyl group, such as one of those exemplified above for R, which is the same as or different from R, or an alkoxy group, such as the alkoxy groups corresponding to the aforementioned alkyl groups; and R'', when present, may be any of the substituents mentioned above as exemplary of R' and may be the same as or different from R'.

The preferred organometallic compounds are those in which M is aluminum. Utilizable aluminum compounds include chlorides, such as dimethylaluminum chloride, diethylaluminum chloride, dipropylaluminum chloride, diisobutylaluminum chloride, the corresponding alkylaluminum dichlorides, etc., and mixtures of such chlorides; but the chlorides are generally not particularly preferred because of the halogen residue they contribute to polymers made in their presence. The more preferred aluminum compounds are the trialkylaluminums, dialkylaluminum hydrides, dialkylaluminum alkoxides, and alkylaluminum dialkoxides, such as trimethylaluminum, triethylaluminum, tripropylaluminum, tributylaluminum, triisobutylaluminum, isopropenylaluminum, trihexylaluminum, trioctylaluminum, tridecylaluminum, tridodecylaluminum, etc.; the corresponding alkoxy compounds wherein one or two of the alkyl groups have been replaced by alkoxy groups, such as ethylaluminum diethoxide, diethylaluminum ethoxide, ethylaluminum sesquiethoxide, ethylaluminum diisopropoxide, etc.; diethylaluminum hydride, di-n-propylaluminum hydride, diisobutylaluminum hydride, etc.; and mixtures of such compounds.

Especially preferred aluminum compounds are the trialkylaluminums, particularly triethylaluminum and tri-n-hexylaluminum, which are advantageous to employ because of their cost, availability, and/or effectiveness. When a trialkylaluminum is used as the organometallic compound, it is generally found that—all other factors being constant—the molecular weight distributions of polymers prepared with the catalysts of the invention are narrowed as the chain lengths of the alkyl groups of the trialkylaluminum are lengthened.

The amount of organometallic compound employed is at least substantially the stoichiometric amount, i.e., the amount required to react with all of the available hydroxyl groups on the inorganic oxide. Use of an amount less than the substantially stoichiometric amount would broaden the molecular weight distributions of polymers formed in the presence of the catalyst compositions; use of an amount greater than the substantially stoichiometric amount is permissible within the scope of the invention but frequently serves no practical purpose and can be disadvantageous in that the excess organometallic compound sometimes leads to fouling of the polymerization reactor if not removed from the catalyst composition prior to the composition's being used.

When the number of available hydroxyl groups on the particular inorganic oxide being treated is not known, it can be determined by any conventional technique, e.g., by reacting an aliquot of the inorganic oxide with excess triethylaluminum and determining the amount of evolved ethane. Once the number of available hydroxyl groups on the inorganic oxide is known, the amount of organometallic compound to be employed is chosen so as to provide at least about one mol of organometallic compound per mol of available hydroxyl groups.

The vanadium component of the catalyst compositions of the invention may be any one or more compounds prepared by reacting one molar proportion of $VOCl_3$ and/or $VOBr_3$ with about 0.5 to 1 molar proportion of a diol corresponding to the formula OH-R-OH, wherein R is a divalent hydrocarbon radical having a chain length of 2 to 16 carbon atoms—the catalyst compositions containing the compounds prepared by the use of the higher ratios of $VOCl_3$ and/or $VOBr_3$ to diol generally providing polymers having narrower molecular weight distributions. As far as effectiveness of the catalyst compositions in controlling molecular weight distribution is concerned, it does not appear to matter if the R of the diol is a straight-chain alkylene group, i.e., $-(CH_2)_{2-16}-$, an alkylene group having one or more short or long branches—preferably saturated aliphatic branches—attached to one or more of the carbons in the chain of 2 to 16 carbon atoms, e.g., a group such as $-CH_2C(CH_3)_2CH_2-$, $-CH(CH_3)CH_2-$, $-CH[(CH_2)_5CH_3](CH_2)_{10}CH_2-$, etc., or the like. What does matter is the chain length of the divalent hydrocarbon radical, since the molecular weight distributions of polymers formed in the presence of the catalyst compositions of the invention narrow as that chain length is increased.

Thus, all other factors being constant, one chooses a vanadium compound prepared from a diol wherein R has a relatively short chain length when polymers having a relatively broad molecular weight distribution are desired and, conversely, a vanadium compound prepared from a diol having a relatively long chain length when polymers having a relatively narrow molecular weight distribution are desired. However, since, as indicated above, other variables, such as the chain length of an alkyl group attached to the metal of the organometallic compound, can be varied to broaden or narrow the molecular weight distributions of polymers prepared in the presence of the catalyst compositions, it is generally found possible to prepare polymers having desired molecular weight distributions in the blow molding or injection molding range with the preferred vanadium compounds of the invention, i.e., vanadium compounds prepared by reacting $VOCl_3$ with a diol corresponding to the formula HO-R-OH, wherein R is a straight- or branched-chain alkylene group containing 2 to 6 carbon atoms.

The amount of vanadium compound(s) employed in the practice of the invention may be varied considerably but is generally such as to provide at least about 0.001 mol of vanadium compound per mol of organometallic compound. When the catalyst composition is to be prepared by the preferred process described below, wherein no washing step is utilized during or after preparation of the compositions, the amount of vanadium compound employed should not be substantially in excess of the amount capable of reacting with the treated support, i.e., about 1 mol of vanadium compound per mol of organometallic compound. Use of a greater amount would serve no practical purpose and could be disadvantageous in that the excess vanadium compound could lead to fouling of the polymerization reactor. However, a larger amount of vanadium compound may be employed when fouling of the reactor is not expected to be a problem and/or excess vanadium compound will be removed from the catalyst composition before the composition is used. In the practice of the invention, the amount of vanadium compound employed is generally not in excess of about 3 mols per mol of organometallic compound; and excellent results are obtained by the use of about 0.03 to 0.3 mol of vanadium compound per mol of organometallic compound, i.e., about 3 to 30 mols of organometallic compound per mol of vanadium compound.

As indicated above, the catalyst compositions of the invention are prepared by drying the inorganic oxide, reacting the dried inorganic oxide with the organometallic compound, and reacting the thus-treated support with the vanadium compound. The conditions under which the inorganic oxide are dried are not critical as long as they are adequate to provide an inorganic oxide that has surface hydroxyl groups and is substantially free of adsorbed water. However, it is ordinarily preferred to dry the inorganic oxide at about 100°–1000° C., with or without a nitrogen or other inert gas purge, until substantially all adsorbed water is removed. Also, although improved results are obtained by the use of the catalyst compositions of the invention, regardless of the particular temperature at which the inorganic oxide is dried, the drying temperature has been found to have a negligible-to-noticeable effect on those results—optimum results generally being obtained when the inorganic oxide has been dried at about 200°–600° C., but drying temperatures of about 500°–600° C. generally being preferred for optimum results when the inorganic oxide is alumina. The time required for drying of the inorganic oxide varies, of course, with the particular drying temperature used but is usually in the range of about 5–16 hours.

When the inorganic oxide has been substantially freed of adsorbed water, its surface hydroxyl groups may be reacted with the organometallic compound in any suitable manner, conveniently by (1) adjusting its temperature, if necessary, to the temperature at which the reaction with the organometallic compound is to be conducted, (2) slurrying it in an inert liquid hydrocarbon, generally a $C_4$–$C_8$ hydrocarbon, such as isobutane, pentane, isopentane, hexane, cyclohexane, heptane, isooctane, etc., and mixtures thereof with one another and/or with other materials commonly present in commercial distillation cuts having the desired boiling range, (3) adding a substantially stoichiometric amount of the organometallic compound in neat or solution form, and (4) maintaining the organometallic compound in intimate contact with the inorganic oxide, e.g., by agitating the slurry, for a time sufficient to ensure substantially complete reaction with the available hydroxyl groups, generally at least about 5 minutes. The reaction may be conducted with or without pressure and at ambient or reflux temperatures, depending on the particular organometallic compound employed, as will be readily understood by those skilled in the art. When the organometallic compound is added in solution form, it is generally preferred, though not required, that the solvent be the same inert liquid hydrocarbon as is already present in the slurry.

The reaction of the vanadium component with the treated support may also be accomplished by conventional means, such as any of the techniques described in British Pat. No. 1,489,410, the teachings of which are incorporated herein by reference. However, it is most desirably accomplished simply by adding the vanadium compound in neat or solution form to the slurry of treated support and maintaining it in intimate contact with the treated support for a time sufficient to provide for substantially complete reaction, usually at least about 5 minutes and preferably about 10-60 minutes, although, actually, the reaction is virtually instantaneous.

When the vanadium compound, or one of the vanadium compounds, employed in the practice of the invention is a compound that the catalyst manufacturer has synthesized for that use, it is frequently convenient to add it to the slurry of treated support in the form of the total reaction mixture resulting from the synthesis, e.g., an inert liquid hydrocarbon solution of the desired vanadium compound and any by-products and/or unreacted starting materials.

After the vanadium component has been reacted with the other catalyst components, the resultant catalyst composition may or may not require further treatment to make it suitable for use, depending on the particular process that has been used to prepare the catalyst composition and the particular type of polymerization process in which it is to be used. For example, if the catalyst composition has been prepared by a type of process which results in its being already dry when reaction with the vanadium component has been accomplished, no further treatment is likely to be necessary if the composition is to be used in a gas-phase polymerization process; but slurrying of the composition in a suitable liquid medium may be desirable if it is to be used in a slurry or solution polymerization process. On the other hand, if the catalyst composition has been prepared by the preferred process described above, i.e., if the inorganic oxide has been slurried before the other components are added, it is already suitable for use in a slurry or solution polymerization process but will have to be dried to make it suitable for use in a gas-phase polymerization process. When the composition is to be dried, i.e., freed of any liquid medium used in its preparation, the drying may be achieved by any conventional technique, e.g., filtration, centrifugation, evaporation, blowing with nitrogen, etc.

Regardless of the particular technique used to prepare the catalyst compositions of the invention, it should be kept in mind that they are Ziegler catalysts and are therefore susceptible to poisoning by the materials, such as oxygen, water, etc., that are known to reduce or destroy the effectiveness of Ziegler catalysts. Accordingly, they should be prepared, stored, and used under conditions that will permit them to be useful as polymerization catalysts, e.g., by the use of an inert gas atmosphere, such as nitrogen.

Use of the catalyst compositions of the invention does not require any modifications of known techniques for the polymerization of ethylene, with or without comonomers. Thus, the polymerization may be conducted by a solution, slurry, or gas-phase technique, generally at a temperature in the range of about 0°-120° C. or even higher, and under atmospheric, subatmospheric, or superatmospheric pressure conditions; and conventional polymerization adjuvants, such as hydrogen, haloalkanes, etc., and conventional catalyst concentrations, e.g., about 0.01-5% by weight of monomer, may be employed if desired. However, it is generally preferred to use the catalyst compositions at a concentration such as to provide about 0.000001-0.005%, most preferably about 0.00001-0.0003%, by weight of vanadium, based on the weight of monomer(s), in the polymerization of ethylene, alone or with up to about 50%, based on the weight of total monomer, of one or more higher alpha-olefins, in a gas-phase polymerization process utilizing superatmospheric pressures, temperatures in the range of about 65°-115° C., and hydrogen and haloalkane adjuvants.

Comonomers, when employed, are generally alpha-olefins containing 3-12 carbon atoms, e.g., propylene, butene-1, pentene-1, 4-methylpentene-1, hexene-1, heptene-1, octene-1, nonene-1, decene-1, dodecene-1, etc., and mixtures thereof.

The invention is particularly advantageous in that it provides catalyst compositions which (1) have the active ingredients chemically-attached to an inorganic oxide support, (2) are capable of producing ethylene polymers having a controlled molecular weight distribution and a good balance of physical properties by an economical gas-phase process that gives a high yield of polymer and (3) can also be used to prepare such polymers by slurry or solution processes. The fact that high yields of polymer can be obtained by the use of the catalyst compositions is particularly unexpected in that these high yields are attainable even when the catalyst compositions are prepared by the preferred process wherein no washing step is required or utilized during or after preparation of the compositions. Both experience in the field and the teachings of the prior art indicate that at least one washing step should be required in the preparation of such compositions when high yield catalysts are desired.

The following examples are given to illustrate the invention and are not intended as a limitation thereof. In these examples, compositions and processes that are illustrative of the invention are distinguished from those that are outside the scope of the invention and are included only for comparative purposes by using an alphabetic designation for any example or run that is a comparative example and a numeric designation for the examples and runs that are illustrative of the invention. Yields given in the examples are measures of productivity in terms of the number of grams of polymer produced per gram of catalyst per hour, melt indices ($MI_2$) are those determined by ASTM test D-1238-65T using a 2160-gram weight, while the NVR values are "normalized" melt viscosity ratios determined by (1) measuring the apparent viscosities of the polymers at 30 sec$^{-1}$ and 300 sec.$^{-1}$, respectively, at 200° C. in an Instron capillary rheometer and (2) normalizing them to $V_{30}=5$ by the equation:

NVR=antilog (0.14699+0.7897 log V₃₀−log V₃₀₀)

$NVR = \text{antilog}(0.14699 + 0.7897 \log V_{30} - \log V_{300})$ where $V_{30}$ and $V_{300}$ are the measured apparent viscosities. This normalization permits comparison of the viscosity ratios of polymers having different $V_{30}$ values, since the unnormalized $V_{30}/V_{300}$ ratio is a function of $V_{30}$. The NVR is constant for any given catalyst over an $MI_2$ range of about 1–30, and only slight deviations occur outside of that range.

In the examples, the following procedures are used to prepare the catalyst compositions and polymers.

PREPARATON OF CATALYSTS

In the preparation of each of the catalysts, dry Davison 952 silica gel (a commercial inorganic oxide having a surface area of about 250–350 square meters per gram, a pore volume of about 1.5–1.7 cc per gram, and an average particle size of about 65–75 microns) by heating it under dry, deoxygenated nitrogen for about 16 hours at a temperature of about 225°–275° C. to provide an activated oxide containing about 1.4 mmols of available hydroxyl groups per gram. Cool the activated oxide to ambient temperature under a purified nitrogen blanket, suspend it in commercial hexane, add neat trialkylaluminum, and stir the resultant slurry for about 30 minutes. Then add a vanadium compound in neat or solution form—in the cases of the catalyst compositions of the invention, using a solution that has been obtained by reacting a diol with $VOCl_3$ in hexane. Stir the resultant slurry for an additional 30 minutes, allow the hexane and catalyst layers to separate, decant the clear hexane layer, and remove the remaining hexane under a nitrogen purge to produce a powdered catalyst. The particular ingredients used to prepare the catalysts and the amounts of trialkylaluminum and vanadium compounds added per gram of inorganic oxide are shown in the examples and/or tables.

SLURRY POLYMERIZATION

Charge 1.5 liters of dry hexane to a suitable autoclave under a dry, deoxygenated nitrogen atmosphere, add 1.1 cc of a 30% solution of triethylaluminum in heptane as an activator-scavenger, stir, and add a slurry of 0.1–0.4 gram of catalyst powder in, respectively, 1–4 ml of commercial hexane. Raise the temperature of the reactor to 85°–90° C., pressurize the reactor with enough hydrogen to achieve the production of a polymer having the desired melt index, add about 80–100 cc of liquid butene-1 as a comonomer, raise the reactor pressure to about 2.1 MPa with ethylene, and hold the pressure at that level throughout the polymerization by adding ethylene as needed. Immediately after pressurizing the reactor with monomer, add 5 cc of a 0.25% solution of chloroform in hexane as a promoter; and, at 15-minute intervals, thereafter, add supplemental 5 cc aliquots of the promoter solution. After 30–60 minutes, stop the polymerization by venting the autoclave, opening the reactor, filtering the polymer from the liquid medium, and drying the polymer.

GAS-PHASE POLYMERIZATION

Charge the catalyst powder to a vertical cylindrical reactor adapted to contain a fluidized bed of catalyst and product particles and to permit the separation and return of entrained particles in unreacted gas by the use of a disengaging zone of larger diameter at the top of the bed.

Introduce a stream or streams of ethylene, any comonomer(s), chloroform, and hydrogen to the reactor. Continuously withdraw unreacted or recycle gas from the top of the disengaging zone, pass it through a heat exchanger to maintain a bed temperature of about 95°–100° C., and introduce it at the bottom of the reactor at a rate sufficient to give a superficial velocity of about 25 cm/sec in the bed.

Introduce make-up monomer, chloroform, and hydrogen into the recycle gas line so as to maintain the reactor pressure at about 3.5 Mpa and to provide about 40 mmols of chloroform per mmol of vanadium per hour, and feed fresh catalyst particles into the reactor below the top of the bed so as to provide a vanadium feed rate of one mmol per hour. Add triethylaluminum as a scavenger and supplemental activator during the polymerization so as to provide a triethylaluminum feed rate of 20 mmol per hour. Withdraw polymer product semi-continuously from the bottom of the bed at a rate such as to maintain a constant bed level. Take aliquots of withdrawn polymer for testing.

EXAMPLE I

Prepare ten catalyst compositions by the catalyst preparation procedure described above. The use each of the catalyst compositions to prepare an ethylene/butene-1 copolymer by the slurry polymerization procedure described above. The amounts of ingredients employed in the production of the catalyst compositions, and the yields, melt indices, and normalized viscosity ratios (NVR), i.e., molecular weight distributions, of the polymers are shown in Table I.

TABLE I

| Run # | Catalyst Compostion | Yield | MI₂ | NVR |
|---|---|---|---|---|
| A | $VOCl_3/Al(C_2H_5)_3/SiO_2$<br>0.1 mmol 1.4 mmol 1 g | 600 g | 0.6 | 2.55 |
| B | $C_2H_5OVOCl_2/Al(C_2H_5)_3/SiO_2$<br>0.1 mmol 1.4 mmol 1 g | 288 g | 0.3 | 2.54 |
| C | $n\text{-}C_6H_{15}OVOCl_2/Al(C_2H_5)_3/SiO_2$<br>0.1 mmol 1.4 mmol 1 g | 280 g | 0.4 | 2.49 |
| D | $n\text{-}C_8H_{17}OVOCl_2/Al(C_2H_5)_3/SiO_2$<br>0.1 mmol 1.4 mmol 1 g | 290 g | 0.2 | 2.57 |
| 1 | $[HO(CH_2)_2OH + VOCl_3]/Al(C_2H_5)_3/SiO_2$<br>0.2 mmol 0.4 mmol 1.5 mmol 1 g | 653 g | 0.1 | 2.61 |
| 2 | $[HO(CH_2)_3OH + VOCl_3]/Al(C_2H_5)_3/SiO_2$<br>0.05 mmol 0.1 mmol 1.5 mmol 1 g | 313 g | 5.9 | 2.33 |
| 3 | $[HO(CH_2)_3OH + VOCl_3]/Al(C_2H_5)_3/SiO_2$<br>0.2 mmol 0.4 mmol 1.5 mmol 1 g | 997 g | 0.7 | 2.31 |
| 4 | $[HOCH_2C(CH_3)_2CH_2OH + VOCl_3]/Al(C_2H_5)_3/SiO_2$<br>0.2 mmol 0.4 mmol 1.5 mmol 1 g | 993 g | 1.6 | 2.39 |
| 5 | $[HO(CH_2)_4OH + VOCl_3]/Al(C_2H_5)_3/SiO_2$<br>0.2 mmol 0.4 mmol 1.5 mmol 1 g | 455 g | 0.2 | 2.27 |
| 6 | $[HO(CH_2)_6OH + VOCl_3]/Al(C_2H_5)_3/SiO_2$ | 818 g | 1.9 | 2.16 |

TABLE I-continued

| Run # | Catalyst Compostion | Yield | MI₂ | NVR |
|---|---|---|---|---|
| | 0.2 mmol 0.4 mmol 1.5 mmol 1 g | | | |

As demonstrated above, (A) the molecular weight distributions of ethylene polymers prepared in the presence of catalyst compositions of the type taught in British Patent No. 1,489,410 are substantially unaffected by (1) the substitution of an alkoxy group-containing vanadium compound, i.e., the reaction product of a monohydroxy alcohol with vanadium oxytrichloride, for vanadium oxytrichloride or (2) alterations in the chain lengths of the alkoxy groups of the alkoxy group-containing vanadium compounds but (B) replacement of the vanadium oxytrichloride or alkoxyvanadium oxydichloride with a reaction product of vanadium oxytrichloride and a diol permits the polymer molecular weight distributions to be controlled by varying the length of the carbon chain separating the —OH groups—broader molecular weight distributions being obtained when that chain is shortened and narrower molecular weight distributions being obtained when that chain is lengthened. The following two examples show that the catalyst compositions of the prior art and of the present invention affect polymer molecular weight distributions in substantially the same way when used in gas-phase processes for the polymerization of ethylene, with or without alpha-olefin comonomers.

EXAMPLE II

Repeat Example I except for using each of the ten catalyst compositions to prepare an ethylene/propylene copolymer by the gas-phase polymerization procedure described above. Similar results are observed, the substitution of an alkoxyvanadium dichloride for vanadium oxytrichloride having no significant effect on polymer molecular weight distribution, but the substitution of a vanadium oxytrichloride/diol reaction product permitting control of polymer molecular weight distribution by varying the length of the carbon chain separating the —OH groups.

EXAMPLE III

Repeat Example II except for employing no propylene in the gas-phase polymerization processes. Similar results in the abilities of the catalyst compositions to control polymer molecular weight distribution are observed.

EXAMPLE IV

Prepare two catalyst compositions by the catalyst preparation procedure described above, and use each of the compositions to prepare an ethylene/butene-1 copolymer by the slurry polymerization procedure which is also described above. The amounts of ingredients employed in the production of the catalyst compositions, and the melt indices and NVR values of the polymers are shown in Table II.

TABLE II

| Run # | Catalyst Composition | MI₂ | NVR |
|---|---|---|---|
| 7 | [HO(CH₂)₃OH + VOCl₃]/Al(C₂H₅)₃/SiO₂ 0.2 mmol 0.4 mmol 1.5 mmol 1 g | 0.7 | 2.31 |
| 8 | [HO(CH₂)₃OH + VOCl₃]/Al(C₂H₅)₃/SiO₂ 0.2 mmol 0.2 mmol 1.5 mmol 1 g | 0.3 | 2.59 |

The preceding example shows that variations in the diol/vanadium oxytrihalide mol ratios employed in preparing the catalyst compositions of the invention can be used as an additional means of controlling polymer molecular weight distribution—narrower molecular weight distributions being obtained with lower diol/VOX₃ mol ratios. The following example demonstrates another means of further controlling polymer molecular weight distribution, i.e., varying the organometallic compounds used as components of the catalyst compositions. As shown therein, an increase in the chain length of alkyl groups attached to the Group III metal of the organometallic compound results in a narrowing of the molecular weight distributions of polymers formed in the presence of catalyst compositions of the invention.

EXAMPLE V

Prepare two catalyst compositions by the catalyst preparation procedure described above, and use each of the compositions to prepare an ethylene/butene-1 copolymer by the slurry polymerization procedure which is also described above. The ingredients employed in the production of the catalyst compositions, the amounts used, and the yields, melt indices, and NVR values of the polymers are shown in Table III.

TABLE III

| Run # | Catalyst Composition | Yield | MI₂ | NVR |
|---|---|---|---|---|
| 9 | [VOCl₃ + HO(CH₂)₆OH]/Al(C₂H₅)₃/SiO₂ 0.4 mmol 0.2 mmol 1.5 mmol 1 g | 818 g | 1.98 | 2.16 |
| 10 | [VOCl₃ + HO(CH₂)₆OH]/Al(C₆H₁₃)₃/SiO₂ 0.2 mmol 0.1 mmol 1.5 mmol 1 g | 372 g | 11.7 | 2.02 |

Similar results in controlling the molecular weight distributions of ethylene polymers are obtained when the examples are repeated except that the catalyst components, component proportions, comonomers, comonomer proportions, and/or polymerization conditions specified in the examples are replaced with catalyst components, component proportions, comonomers, comonomer proportions, and/or polymerization conditions taught to be their equivalents in the specification.

We claim:
1. A catalyst composition consisting essentially of the product obtained by:
   (1) drying an inorganic oxide having surface hydroxyl groups to form a support that is substantially free of adsorbed water,
   (2) reacting the surface hydroxyl groups of the support with at least a substantially stoichiometric amount of at least one organometallic compound corresponding to the formula $R_xMR'_yR''_z$, wherein M is a metal of Group III of the periodic table, R is an alkyl group containing 1 to 12 carbon atoms, R' and R'' are independently selected from the group consisting of H, Cl, and alkyl and alkoxy groups containing 1 to 12 carbon atoms, x has a value of 1 to 3, and y and z both represent values of 0 to 2, the sum of which is not greater than 3-x, and (3) reacting the thus-treated support with at least about 0.001 mol, per mol of organometallic compound, of at least one vanadium compound prepared by reacting one molar proportion of $VOCl_3$ and/or $VOBr_3$ with about 0.5 to 1 molar proportion of a diol corresponding to the formula HO-R-OH, wherein R is a divalent hydrocarbon radical having a chain length of 2 to 16 carbon atoms.

2. The composition of claim 1 wherein the support is an inorganic oxide selected from the group consisting of silica, alumina, magnesia, and mixtures thereof.

3. The composition of claim 2 wherein the inorganic oxide is silica.

4. The composition of claim 1 wherein the organometallic compound is a compound corresponding to the formula RAlR'R'', wherein at least one of the R, R', and R'' substituents is an alkyl group containing 1 to 12 carbon atoms and the remaining substituents are independently selected from the group consisting of hydrogen and alkyl and alkoxy groups containing 1 to 12 carbon atoms.

5. The composition of claim 4 wherein the organometallic compound is a trialkylaluminum.

6. The composition of claim 5 wherein the trialkylaluminum is triethylaluminum.

7. The composition of claim 5 wherein the trialkylaluminum is tri-n-hexylaluminum.

8. The composition of claim 1 wherein the vanadium compound is the reaction product of $VOCl_3$ and a diol corresponding to the formula HO-R-OH, wherein R is an alkylene radical containing 2 to 6 carbon atoms.

9. The composition of claim 1 wherein the amounts of materials employed in its preparation are such as to provide, as starting materials, about 3 to 30 mols of organometallic compound per mol of vanadium compound.

10. The composition of claim 1 wherein the amount of organometallic compound reacted with the surface hydroxyl groups of the support is the substantially stoichiometric amount.

11. A process for preparing the catalyst composition of claim 1 which consists essentially of (1) drying the inorganic oxide to remove substantially all adsorbed water, (2) slurrying the dried inorganic oxide in an inert liquid hydrocarbon, (3) adding at least a substantially stoichiometric amount of the organometallic compound to react it with the surface hydroxyl groups of the inorganic oxide, (4) adding the vanadium compound to react it with the treated inorganic oxide, and (5) drying the composition thus formed.

12. The process of claim 11 wherein the inorganic oxide is dried at about 100° to 1000° C. until substantially all adsorbed water is removed and is then cooled to ambient temperature before being slurried.

13. The process of claim 12 wherein the inorganic oxide is silica and the drying temperature is about 200° to 600° C.

14. The process of claim 11 wherein the organometallic and vanadium compounds are added to the reaction mixture in neat form.

15. The process of claim 11 wherein at least one of the organometallic and vanadium compounds is added to the reaction mixture in the form of an inert liquid hydrocarbon solution.

* * * * *